(12) United States Patent
Kou et al.

(10) Patent No.: US 10,859,204 B2
(45) Date of Patent: Dec. 8, 2020

(54) HOISTING SHEAVE SHAFT, HOISTING SHEAVE AND LUBRICATING DEVICE THEREOF

(71) Applicant: TAIYUAN UNIVERSITY OF TECHNOLOGY, Shanxi (CN)

(72) Inventors: Ziming Kou, Shanxi (CN); Yongcun Guo, Shanxi (CN); Juan Wu, Shanxi (CN); Jianwei Yang, Shanxi (CN); Fen Yang, Shanxi (CN); Tengyu Li, Shanxi (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 16/862,799

(22) Filed: Apr. 30, 2020

(65) Prior Publication Data

US 2020/0256510 A1    Aug. 13, 2020

Related U.S. Application Data

(63) Continuation of application No. PCT/CN2018/092116, filed on Jun. 21, 2018.

(30) Foreign Application Priority Data

May 29, 2018    (CN) .......................... 2018 105 30368

(51) Int. Cl.
*F16N 7/40* (2006.01)
*B66D 1/36* (2006.01)
(Continued)

(52) U.S. Cl.
CPC ................. *F16N 7/40* (2013.01); *B66D 1/36* (2013.01); *F16C 3/02* (2013.01); *B66B 15/02* (2013.01);
(Continued)

(58) Field of Classification Search
CPC .................................. F16H 55/36; F16H 55/52
See application file for complete search history.

(56) References Cited

U.S. PATENT DOCUMENTS 2,625,447 A * 1/1953 Deventer ................ F16H 55/36
384/144
3,820,663 A * 6/1974 Junes et al. .............. B66D 1/14
212/99

(Continued)

FOREIGN PATENT DOCUMENTS

| CN | 202785204 U | 3/2013 |
| CN | 203093571 U | 7/2013 |

(Continued)

*Primary Examiner* — Emmanuel M Marcelo
(74) *Attorney, Agent, or Firm* — Wayne & Ken, LLC; Tony Hom

(57) ABSTRACT

This invention discloses a hoisting sheave shaft, a hoisting sheave and a lubricating device thereof, where the hoisting sheave shaft is provided with a first oil injection channel extending axially; an oil inlet of the first oil injection channel is arranged on an end surface of the hoisting sheave shaft; the hoisting sheave shaft is also radially provided with at least one second oil injection channel; the second oil injection channel intersects with the first oil injection channel; and an oil outlet of the second oil injection channel is arranged on an outer circular surface of the hoisting sheave shaft.

19 Claims, 4 Drawing Sheets

(51) Int. Cl.
*F16C 3/02* (2006.01)
*B66B 15/02* (2006.01)
*F16N 31/00* (2006.01)

(52) U.S. Cl.
CPC .... *B66D 2700/026* (2013.01); *F16C 2326/58* (2013.01); *F16C 2361/63* (2013.01); *F16N 31/00* (2013.01); *F16N 2210/12* (2013.01)

(56) References Cited

U.S. PATENT DOCUMENTS

| | | | | |
|---|---|---|---|---|
| 5,213,310 A | * | 5/1993 | Beattie | B66F 7/04 137/596.2 |
| 2011/0000668 A1 | * | 1/2011 | Tunget | E21B 29/06 166/285 |
| 2014/0283647 A1 | * | 9/2014 | Blessing | B60K 6/42 74/661 |
| 2018/0163827 A1 | * | 6/2018 | Kaji | F16H 9/24 |

FOREIGN PATENT DOCUMENTS

| | | | |
|---|---|---|---|
| CN | 203114858 U | | 8/2013 |
| CN | 203638934 U | | 6/2014 |
| CN | 104454947 A | | 3/2015 |
| CN | 204344658 U | | 5/2015 |
| CN | 2015-541047 | * | 7/2015 |
| CN | 204512388 U | | 7/2015 |
| CN | 2015-77884V | * | 11/2015 |
| CN | 2017-69996 B | * | 10/2017 |
| CN | 2018-158697 | * | 2/2018 |
| CN | 108266629 A | | 7/2018 |
| CN | 2018-89126 B | * | 11/2018 |
| GB | 543261 A | | 2/1942 |
| JP | H107330280 A | | 12/1995 |

* cited by examiner

HOISTING SHEAVE SHAFT, HOISTING SHEAVE AND LUBRICATING DEVICE THEREOF

CROSS-REFERENCE TO THE RELATED APPLICATIONS

This application is a continuation of International Application No. PCT/CN2018/092116, filed on Jun. 21, 2018, which claims the benefit of priority from Chinese Patent Application No. 201810530368.7, filed on May 29, 2018. The content of the aforementioned application, including any intervening amendments thereto, is incorporated herein by reference in its entirety.

TECHNICAL FIELD

This invention relates to mine hoisting systems, and more particularly to a hoisting sheave shaft, a hoisting sheave and a lubricating device thereof.

BACKGROUND

The hoisting sheave is a crown block provided at the top of a mine shaft derrick to adjust the movement direction of the steel wire ropes, which plays a role in supporting the steel wire ropes connecting the hoisting drum and the hoisting vessel, and guiding the turning of the steel wire ropes. Among the existing hoisting sheaves, the floating sheave is widely used due to desirable applicability to hoisting systems with multiple steel wire ropes. However, due to the poor air quality in the mine area and the undesirable lubrication between the floating sheave and the hoisting sheave shaft, the hoisting sheave shaft, the floating sheave and the bearing bush therebetween are prone to abrasion, resulting in a short service life. For the purpose of extending the service life, many approaches have been used to improve the lubrication, but the effect is not satisfactory enough or the lubrication process will affect the operation of the hoisting sheave.

SUMMARY

An object of the invention is to provide a hoisting sheave shaft, a hoisting sheave and a lubricating device thereof to overcome the defects in the prior art, where the lubricating device can automatically perform lubrication between the floating sheave and the hoisting sheave shaft without affecting the operation of the hoisting sheave.

Technical solutions of the invention are specifically described as follows.

This application provides a hoisting sheave shaft, wherein the hoisting sheave shaft is axially provided with a first oil injection channel, an oil inlet of the first oil injection channel is arranged on an end face of the hoist head sheave shaft; the hoisting sheave shaft is provided with at least one second oil injection channels along a radial direction, the second oil injection channel intersects with the first oil injection channel, an oil outlet of the second oil injection channel is arranged on an outer circular surface of the hoisting sheave shaft.

In some embodiments, when there are more than two second oil injection channel, the diameter of the second oil injection channels is set such that the fluxes in the second oil injection channels are the same when the lubricating oil enters the second oil injection channels through the first oil injection channel.

This application also provides a hoisting sheave, including any one of the above-mentioned hoisting sheave shafts, bearing seats installed at two ends of the hoisting sheave shaft, a circumferentially fixed sheave sleeved on the hoisting sheave shaft and at least one floating sheave sleeved on the hoisting sheave shaft; the second oil injection channel and the floating sheave are the same in number, the oil outlet of the second oil injection channel corresponds to the floating sheave.

In some embodiments, the bearing seat is provided with a rolling bearing matched with the hoisting sheave shaft and at least one bearing end cover for protecting the rolling bearing, at least one of the at least one bearing end cover is provided with a first oil injection hole communicating with the first oil injection channel, and the position of the first oil injection hole corresponds to the oil inlet of the first oil injection channel.

In some embodiments, the oil inlet of the first oil injection channel is communicated to the first oil injection hole through the oil injection joint pipe, one end of the oil injection joint pipe is fixed on one of the at least one bearing end cover, and the other end extends into the first oil injection channel.

In some embodiments, an end of the oil injection joint pipe extending into the first oil injection channel is sleeved with a slide ring seal, an outer circular surface of the slide ring seal is in interference fit with an inner wall of the first oil injection channel, an inner wall of the slide ring seal is in clearance fit with an outer circular surface of the oil injection joint pipe.

In some embodiments, the at least one bearing end cover is also provided with a second oil injection hole to lubricate a rolling bearing and an oil suction hole to recycle the waste lubricating oil, the oil outlet of the second oil injection hole corresponds to the location of the rolling body of the rolling bearing, the oil suction inlet of the oil suction hole is located at the rolling body with 180° away from the oil outlet of the second oil injection hole in the circumferential direction.

In some embodiments, the hoisting sheave shaft between the floating sheave and the fixed sheave or between the two floating sheaves is sleeved with a sealing ring to prevent the loss of the lubricating oil, and the sealing ring is also provided with an oil drainage nozzle to facilitate the discharge of waste lubricating oil and an oil plug for plugging the oil drainage nozzle.

This application also provides a hoisting sheave lubricating device, including any one of the above-mentioned hoisting sheaves, an oil injection pump and an oil suction pump.

The oil injection pump is for injecting lubricating oil into the hoist in a timing and quantitative manner.

The oil suction pump is for recycling the waste lubricating oil in the hoisting sheave.

An oil outlet of the oil injection pump is communicated to the hoisting sheave through an oil injection pipe, an oil suction inlet of the oil suction pump is communicated to the hoisting sheave through an oil suction pipe.

In some embodiments, the oil injection pump is also provided with a bubble generation device for adding inert gas into the lubricating oil.

This application provides a hoisting sheave shaft, a hoisting sheave and a lubricating device for the hoisting sheave, where the hoisting sheave shaft is provided with a first oil injection channel extending axially; an oil inlet of the first oil injection channel is arranged on an end surface of the hoisting sheave shaft; the hoisting sheave shaft is further radially provided with at least one second oil injection channel; the second oil injection channel intersects with the first oil injection channel; an oil outlet of the second oil injection channel is arranged on an outer circular surface of the hoisting sheave shaft. Therefore, this application can automatically perform lubrication between the floating sheave and the hoisting sheave shaft without affecting the operation of the hoisting sheave through the oil injection pump and the first oil injection channel and the second oil injection channel respectively axially and radially provided on the hoisting sheave shaft.

Other beneficial effects of this application will be further illustrated below with reference to the embodiments.

DETAILED DESCRIPTION OF EMBODIMENTS

This application provides a hoisting sheave shaft, a hoisting sheave and a lubricating device thereof. The hoisting sheave is axially provided with a first oil injection channel, an oil inlet of the first oil injection channel is arranged on an end surface of the hoist head sheave shaft. The hoist head sheave shaft is also radially provided with a second oil injection channel, the second oil injection channel intersects with the first oil injection channel, an oil outlet of the at least one second oil injection channel is arranged on an outer circular surface of the hoist head sheave shaft.

The hoisting sheave is provided with a hoisting sheave shaft, bearing seats installed at two ends of the hoisting sheave shaft, a circumferentially fixed sheave sleeved on the hoisting sheave shaft and at least one floating sheave sleeved on the hoisting sheave shaft the second oil injection channel and the floating sheave are the same in number, the oil outlet position of the second oil injection channel corresponds to the floating sheave.

The lubricating device for the hoisting sheave includes an oil injection pump and an oil suction pump. An oil outlet of the oil injection pump is connected to the hoisting sheave through an oil injection pipe, and an oil suction inlet of the oil suction pump is connected to the hoisting sheave through an oil suction pipe.

The lubricating device provided herein for the hoisting sheave can automatically perform lubrication between the floating sheave and the hoisting sheave shaft through the first oil injection channel and the second oil injection channel on the hoisting sheave shaft and the oil injection pump without affecting the functioning of the hoisting sheave.

This application will be further illustrated below with reference to the embodiments. It should be understood that the embodiments described herein are merely illustrative of this application, and are not intended to limit this invention.

It should be noted that the term "connection" in this application should be understood broadly unless otherwise specified and limited. For example, it may refer to an electrical connection or an internal communication of two elements; and it may refer to a direct connection or an indirect connection through a medium. The definition of this term can be interpreted by those skilled in the art based on the specific situation.

It should be noted that as used herein, terms "first", "second", "third" are only intended to differentiate similar objects, and do not refer to the order of these objects. Understandably, the order of terms "first", "second", "third" can be changed when allowed. It should be understood that the objects differentiated by the terms "first/second/third" can be interchanged under proper circumstances to ensure that the embodiment of this application described herein can be implemented in an order other than those illustrated or described herein.

Figure 1:
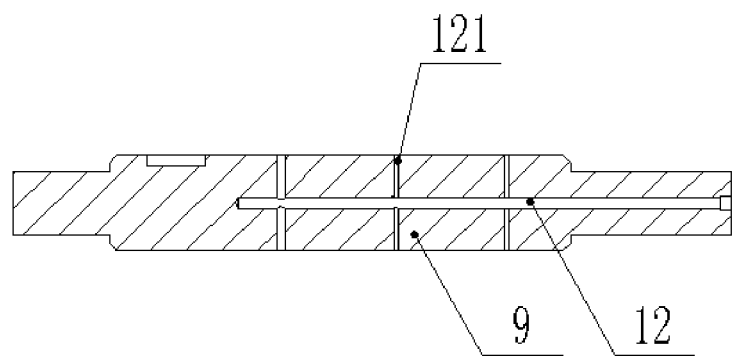
FIG. 1 is a schematic diagram of a hoisting sheave shaft according to an embodiment of the invention.

This application provides a hoisting sheave shaft, as shown in FIG. 1, where the hoisting sheave shaft 9 is provided with a first oil injection channel 12 extending axially. An oil inlet of the first oil injection channel 12 is arranged on an end surface of the hoisting sheave shaft 9. The hoisting sheave shaft 9 is further radially provided with at least one second oil injection channel 121. The second oil injection channel 121 intersects with the first oil injection channel 12, and an oil outlet of the second oil injection channel 121 is arranged on an outer circular surface of the hoisting sheave shaft 9.

A diameter of the second oil injection channel 121 is set as follows to ensure an even lubrication. In the case that there are two or more second oil injection channels 121, the diameter of the second oil injection channels 121 is set such that the second oil injection channels 121 have the same flux when the lubricating oil enters the second oil injection channels 121 from the first oil injection channel 12.

In an embodiment, there are three second oil injection channels 121, and a diameter of these three second oil injection channels 121 is preset size to enable the three second oil injection channels 121 to share the same flux when the lubricating oil enters the second oil injection channels 121 from the first oil injection channel 12.

In an embodiment, the lubricating oil is semi-fluid grease.

To ensure that the flux in the three radial second oil injection channels 121 in the hoisting sheave is the same, it is necessary to calculate the relationship of the radial through-hole areas of the three second oil injection channels 121 according to hydromechanics, where the specific calculation is performed as follows.

A hole with a ratio of the length to the diameter larger than 4 is called a tenuous hole. The three radial through holes in the hoisting sheave have such length-diameter ratio, and thus they can be considered as tenuous holes. The flux of a tenuous hole according to hydromechanics is calculated as follows:

$$q = \frac{\pi d^4}{128 \mu l} \Delta p \tag{1}$$

where, d is the diameter of a tenuous hole;
l is the length of the tenuous hole;
μ is the viscosity of the fluid;
Δp is the pressure difference between the two ends of the tenuous hole.

According to equation (1), for the same fluid, the flux in the tenuous hole relates to the pressure difference Δp and the size of the tenuous hole. The three radial through holes in the hoisting sheave have the same length, and thus the flux therein is in direct proportion to the product of the pressure difference Δp and the biquadrate of the diameter of the hole $d^4$.

Figure 2:
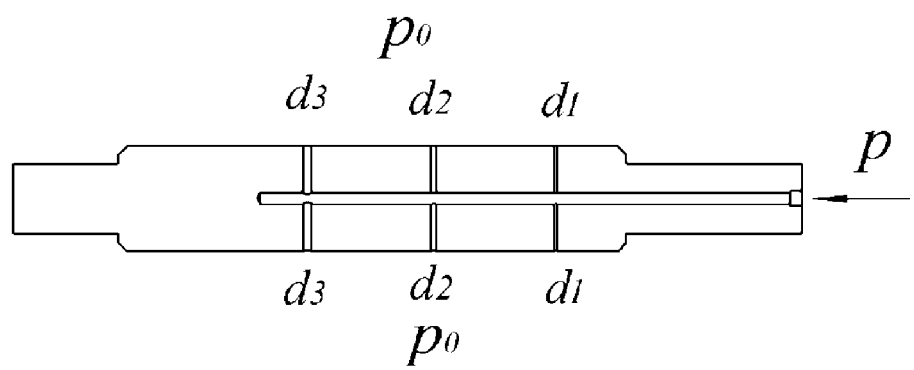
FIG. 2 schematically shows the determination of a diameter of a second oil injection channel in the hoisting sheave shaft according to an embodiment of the invention.

FIG. 2 schematically shows the determination of the diameter of a second oil injection channel 121 in the hoisting sheave shaft provided in this application. As shown in FIG. 2, assuming that the pressure of the lubricating oil to be injected at the opening end of the counterbore of the hoisting sheave is p, the pressure at the lubrication area of the three floating sheaves is $p_0$ (namely, the pressure difference generated when the lubricating oil flows through the first radial through hole is $p-p_0$; the pressure difference generated when the lubricating oil flows through the second radial through hole is $p-2p_0$; and the pressure difference generated when the lubricating oil flows through the third radial through hole is $p-3p_0$), the diameter of the first radial through hole is $d_1$, the diameter of the second radial through hole is $d_2$, the diameter of the third radial through hole is $d_3$, and the pressure loss of the lubricating oil along the radial through holes can be ignored, the fluxes in the radial through holes are respectively calculated as follows:

$$q_1 = \frac{\pi d_1^4}{128\,\mu l}(p - p_0);$$

$$q_2 = \frac{\pi d_2^4}{128\,\mu l}(p - 2p_0);$$

$$q_3 = \frac{\pi d_3^4}{128\,\mu l}(p - 3p_0).$$

When $q_1=q_2$, the following equation can be obtained: $d_1^4(p-p_0)=d_2^4(p-2p_0)$, and thus the relationship between the diameter of the second radial through hole and the diameter of the first radial through hole is determined to be:

$$\frac{d_2}{d_1} = \sqrt[4]{\frac{p-p_0}{p-2p_0}}. \quad (2)$$

When $q_1=q_3$, the following equation can be obtained: $d_1^4(p-p_0)=d_3^4(p-3p_0)$, and thus the relationship between the diameter of the third radial through hole and the diameter of the first radial through hole is determined to be:

$$\frac{d_3}{d_1} = \sqrt[4]{\frac{p-p_0}{p-3p_0}}. \quad (3)$$

According to equations (2) and (3), when the lengths of the radial through holes are equal, the ratios of the diameters of the second and third radial through holes respectively to the diameter of the first radial through hole relate to the initial pressure p and the environment pressure $p_0$, and $d_3>d_2>d_1$. The calculation of specific values requires the values of the initial pressure p, the environment pressure $p_0$ and the flux q, which is not further described here.

Figure 3:
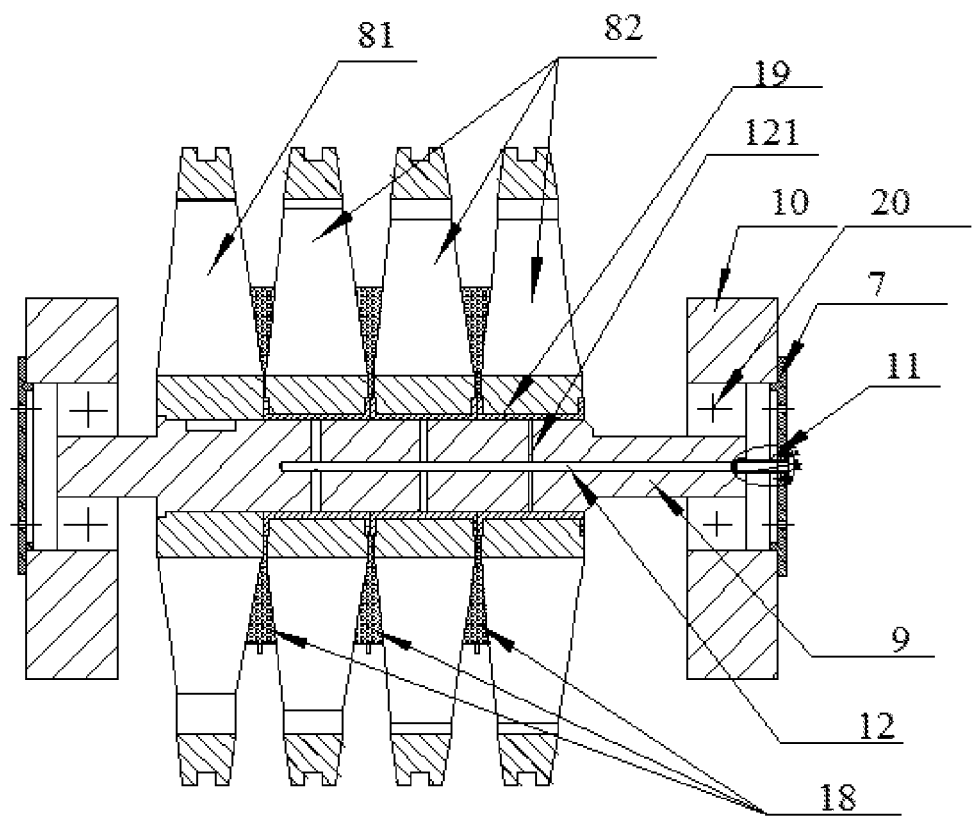
FIG. 3 is a schematic diagram of a hoisting sheave according to an embodiment of the invention.

This application also provides a hoisting sheave. As shown in FIG. 3, the hoisting sheave includes a hoisting sheave shaft 9, bearing seats 10 respectively provided on both ends of the hoisting sheave shaft 9, a circumferentially-fixed sheave 81 sleeved on the hoisting sheave shaft 9 and at least one floating sheave 82 sleeved on the hoisting sheave shaft 9; where the hoisting sheave shaft 9 used herein is the hoisting sheave shaft described above.

The second oil injection channel 121 and the floating sheave 82 are the same in number. An oil outlet of the second oil injection channel 121 corresponds to the floating sheave 82, so that the floating sheave 82 and the hoisting sheave shaft 9 can be better lubricated.

In an embodiment, a bearing bush 19 is also provided between the floating sheave 82 and the hoisting sheave shaft 9 to reduce the friction therebetween, preventing the abrasion of the floating sheave 82 and the hoisting sheave shaft 9. In an embodiment, the lubricating oil in the second oil injection channel 121 is mainly for lubricating the bearing bush 19.

Figure 6:
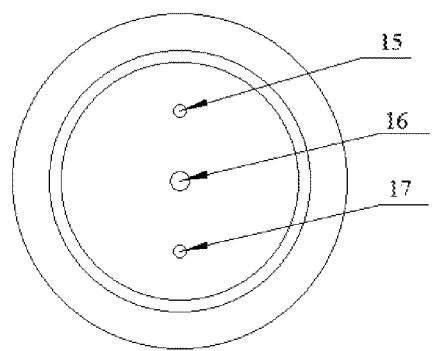
FIG. 6 is a schematic diagram of the bearing end cover at the floating sheave end in the hoisting sheave according to an embodiment of the invention.
Figure 7:
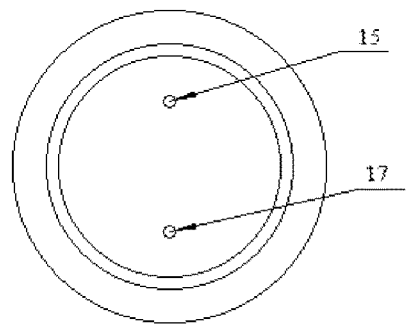
FIG. 7 is a schematic diagram of the bearing end cover at the fixed sheave end in the hoisting sheave according to an embodiment of the invention.

In an embodiment, the bearing seats 10 are both provided with a rolling bearing 20 matched with the hoisting sheave shaft 9 and at least one bearing end cover 7 for protecting the rolling bearing 20. As shown in FIG. 6 or 7, at least one of the at least one bearing end cover 7 is provided with a first oil injection hole 16 communicating with the first oil injection channel 12, and an oil outlet of the first oil injection channel 16 corresponds to an oil inlet of the first oil injection channel 12. The hoisting sheave of this application has a fixed sheave 81 at one end and a floating sheave 82 at the other end, therefore there are two types of bearing end covers 7 provided herein. The first type of the bearing end cover 7 is shown on the right side of FIG. 3. As shown in FIG. 6, this bearing end cover 7 includes a first oil injection hole 16, a second oil injection hole 15 and an oil suction hole 17, and thus the bearing bush 19 of the hoisting sheave shaft 9 and the rolling bearing 20 can be simultaneously lubricated through this bearing end cover 7. The second type of the bearing end cover is shown on the left side of FIG. 3. As shown in FIG. 7, this bearing end cover is free of a first oil injection hole 16, and only includes a second oil injection hole 15 and an oil suction hole 17, and thus this bearing end cover 7 can be only applied to the lubrication of the rolling bearing 20.

In an embodiment, the oil inlet of the first oil injection channel 12 is connected to the first oil injection hole 16 through an oil injection joint pipe 11. One end of the oil injection joint pipe 11 is fixed on the bearing end cover 7, and the other end extends into the first oil injection channel 12, which ensures the smooth inflow of the lubricating oil and can be seen very clearly in FIGS. 4 and 5.

Figure 4:
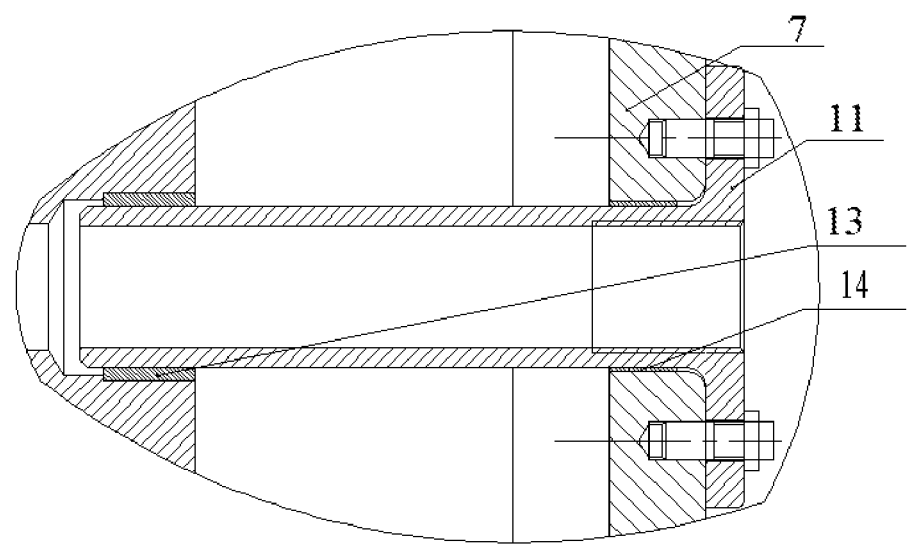
FIG. 4 schematically shows the assembling of an oil injection joint pipe in a bearing end cover in the hoisting sheave according to an embodiment of the invention.

In an embodiment, as shown in FIG. 4, the end of the oil injection joint 11 pipe extending into the first oil injection channel 12 is sleeved with a slide ring seal 13. An outer circular surface of the slide ring seal 13 is in interference fit with an inner wall of the first oil injection channel 12, and an inner wall of the slide ring seal 13 is in clearance fit with an outer circular surface of the oil injection joint pipe 11. Such structure can not only achieve the relative rotation between the hoisting sheave shaft 9 and the oil injection joint pipe 11, that is, achieve the continuous injection of the lubricating oil, but also prevent the lubricating oil from leaking and prevent the external air from entering the first oil injection channel 12. The slide ring seal 13 is a high pressure-resistant slide ring seal.

In an embodiment, as shown in FIG. 4, the other end of the oil injection joint pipe 11 fixed on the bearing end cover 7 is sleeved with a sealing ring 14, which is used to prevent the lubricating oil from leaking.

Figure 5:
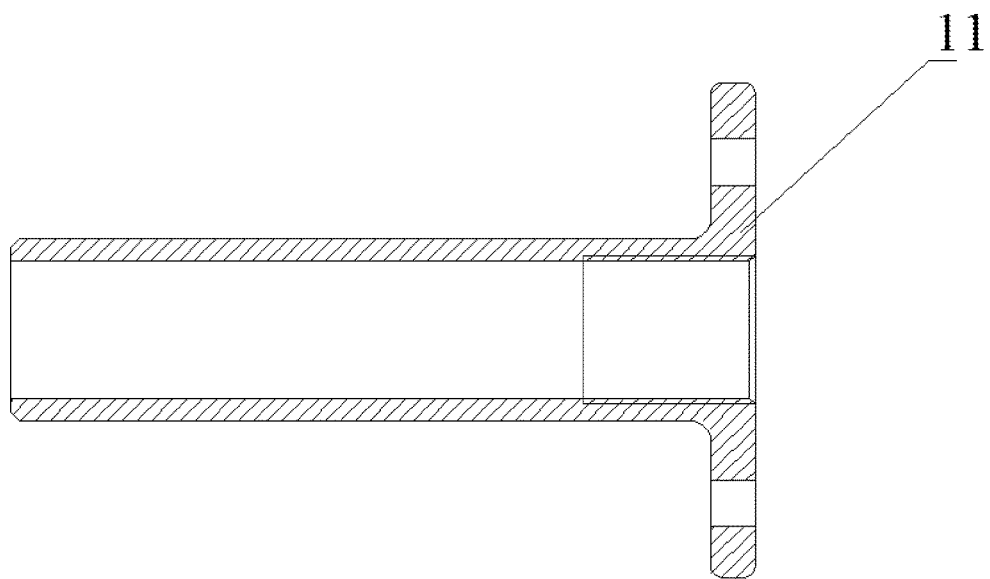
FIG. 5 is a schematic diagram of the oil injection joint pipe in the hoisting sheave according to an embodiment of the invention.

In an embodiment, as shown in FIG. 5, the bearing end cover 7 is also provided with a second oil injection hole 15 for lubricating the rolling bearing 20 and an oil suction hole 17 for recycling the waste lubricating oil. The oil outlet of the second oil injection hole 15 corresponds to the rolling body of the rolling bearing 20, and the oil suction inlet of the oil suction hole 17 is located at the rolling body with 180° away from the oil outlet of the second oil injection hole 15 in the circumferential direction. Therefore, in addition to the lubrication of the hoisting sheave shaft 9, the floating sheave 82 or the bearing bush 19 between the hoisting sheave shaft 9 and the floating sheave 82 through the first oil injection hole 16, the lubrication of the rolling bearing 20 at both ends of the hoisting sheave shaft 9 can also be achieved through the second oil injection hole 15.

The oil suction hole 17 is used to recycle the waste lubricating oil, that is, to recycle the used waste lubricating oil. The injection and recycling can be simultaneously performed to achieve the non-stop injection of lubricating oil. Though it may lead to the recycling of a part of fresh lubricating oil, it can avoid the occurrence of cases that the lubricating oil is insufficient or excessive in the rolling bearing 20.

The oil suction inlet of the oil suction hole 17 is 180° apart from the oil outlet of the second oil injection hole 15 in the circumferential direction on the end surface of the bearing end cover 7 to make the lubricating oil evenly distribute to the whole rolling bearing 20. Since the hoisting sheave has both forward and reverse rotation in operation, the injected lubricating oil can be applied to the whole circumferential surface in both clockwise and counterclockwise directions.

In an embodiment, there are three floating sheaves 82 to meet the requirements of a deep well multi-rope friction hoist.

To prevent the lubricating oil from leaking from the gap between the floating sheave 82 and the hoisting sheave shaft 9, and being radially spun off the hoisting sheave shaft 9 under the impact of centrifugal force, The hoisting sheave shaft 9 between the floating sheave 82 and the fixed sheave 81 or between the two floating sheaves 82 is sleeved with a sealing ring 18, and the sealing ring 18 is also provided with an oil drainage nozzle (not shown in the figures) to facilitate the discharge of waste lubricating oil and an oil plug (not shown in the figures) for plugging the oil drainage nozzle.

In an embodiment, the sealing ring 18 is formed by connecting one end with the other end of a light rubber strip with certain rigidity. Each end of the rubber strip is fixed with a magnet, and the connection is performed through the attraction of the magnets.

The oil drain nozzle passes through the sealing ring 18 to communicate with the surface of the hoisting sheave shaft 9, so that the lubricating oil leaking from the gap between the floating sheave 82 and the hoisting sheave shaft 9 is gathered at the inner wall of the sealing ring 18. The excessive lubricating oil at the inner wall of the sealing ring can be recycled through the oil drain nozzle.

Figure 8:
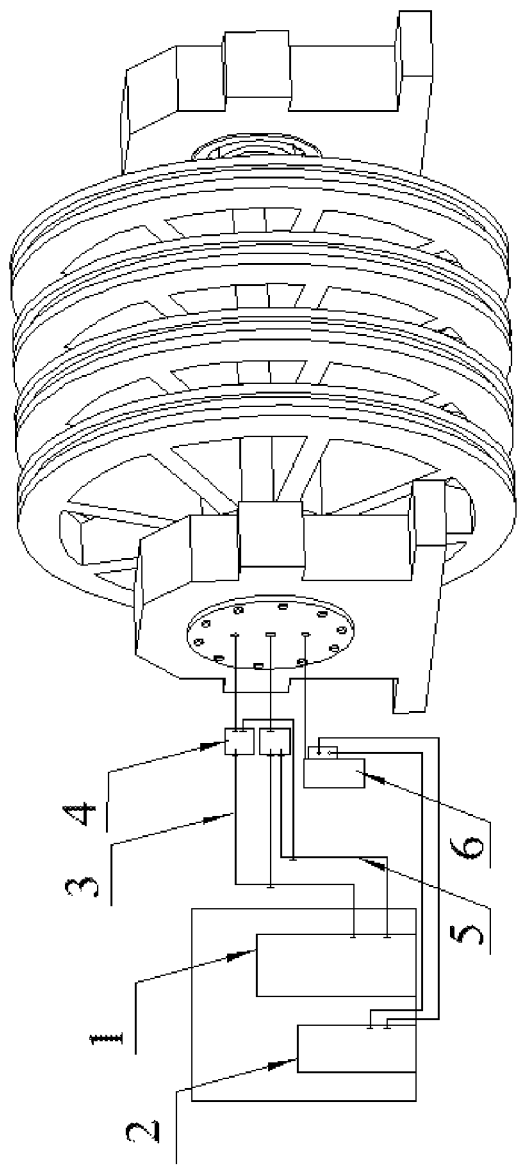
FIG. 8 schematically shows the overall structure of a lubricating device for the hoisting sheave according to an embodiment of the invention.

This application also provides a lubricating device for the above-mentioned hoisting sheave. As shown in FIGS. 6, 7 and 8, the lubricating device includes an oil injection pump 1 and an oil suction pump 2.

The oil injection pump 1 is used for injecting lubricating oil into the hoisting sheave in a timing and quantitative manner.

The oil suction pump 2 is used for recycling the waste lubricating oil in the hoisting sheave.

The oil outlet of the oil injection pump 1 is connected to the hoisting sheave through an oil injection pipe 3, and the oil suction inlet of the oil suction pump 2 is connected to the hoisting sheave through the oil suction pipe.

In an embodiment, as shown in FIG. 3, the hoisting sheave is provided with a second oil injection hole to lubricate the rolling bearing 20. The oil outlet of the oil injection pump 1 is connected to the second oil injection hole through the oil injection pipe 3. In another embodiment, the hoisting sheave is provided with a first oil injection hole communicating with the first oil injection channel 12 and a second oil injection hole for lubricating the rolling bearing 20. The oil outlet of the oil injection pump 1 is connected to the first and the second oil injection hole through the oil injection pipe 3.

In an embodiment, the oil injection pipe 3 is connected to the first oil injection hole 16 through the oil injection joint pipe 11, where the oil injection joint pipe 11 is provided with internal thread for the connection to the oil injection pipe 3.

In an embodiment, the oil injection pump 1 is also provided with a bubble generation device for adding an inert gas into the lubricating oil to improve the lubricating effect. The bubble generation device can add the inert gas into the lubricating oil to form an oil-gas mixture with a specific oil-gas ratio. The oil-gas mixture can effectively reduce the temperature increase of the friction pair. As the structural mechanism of the bubble generation device and the ratio of the oil-gas mixture are known in the art, they are not described in detail herein.

Moreover, the oil injection pump 1 is also provided with a monitoring device 4 to monitor the oil injection progress. The monitoring device 4 is installed on the oil injection pipe 3 to monitor the flux in the oil injection pipe 3 and feed back the flux condition to the oil injection pump 1 through a wire 5. The oil injection pump 1 adjusts the oil output accordingly.

As both the hoisting sheave shaft and the rolling bearing at the two ends thereof need regular lubrication, the oil injection pump 1 is also provided with a distributor to branch out three oil injection pipes 3 to inject oil respectively.

The oil suction pump 2 is connected to the oil suction hole 17 of the hoisting sheave through the oil suction pipe and an oil collector 6. The oil suction pump 2 can generate negative pressure, and the excess grease will be sucked into the oil collector 6 under the effect of the negative pressure.

Described above are merely preferred embodiments of this application, which are not intended to limit the scope of this application. Any modification, replacement and improvement made by those skilled in the art without departing from the spirit of this application shall fall within the scope of this application.

INDUSTRIAL APPLICABILITY

In the embodiments of this application, lubrication between the floating sheave and the hoisting sheave shaft can be automatically performed without affecting the operation of the hoisting sheave through the oil injection pump and the first oil injection channel and the second oil injection channel respectively axially and radially provided on the hoisting sheave shaft.

What is claimed is:

1. A hoisting sheave shaft, wherein the hoisting sheave shaft is provided with a first oil injection channel extending axially, and an oil inlet of the first oil injection channel is provided on an end surface of the hoisting sheave shaft; the hoisting sheave shaft is provided with at least one second oil injection channel along a radial direction, and the at least one second oil injection channel intersects with the first oil injection channel; an oil outlet of the second oil injection channel is provided on an outer circular surface of the hoisting sheave shaft; when there are two or more second oil injection channels, the two or more second oil injection channels are different from each other in diameter such that the two or more second oil injection channels have the same flux when lubricating oil enters the second oil injection channels from the first oil injection channel.

2. A hoisting sheave, comprising the hoisting sheave shaft of claim 1; bearing seats respectively provided at two ends of the hoisting sheave shaft; a fixed sheave that is circumferentially provided and is sleeved on the hoisting sheave shaft; and at least one floating sheave sleeved on the hoisting sheave shaft; wherein the second oil injection channel is the same with the floating sheave in number, and the oil outlet of the second oil injection channel corresponds to the floating sheave in position.

3. The hoisting sheave according to claim 2, wherein each bearing seat is provided with a rolling bearing matched with the hoisting sheave shaft and at least one bearing end cover for protecting the rolling bearing; at least one of the at least one bearing end cover is provided with a first oil injection hole communicating with the first oil injection channel, and the first oil injection hole corresponds to the oil inlet of the first oil injection channel in position.

4. The hoisting sheave according to claim 3, wherein the oil inlet of the first oil injection channel is connected to the first oil injection hole through an oil injection joint pipe, wherein one end of the oil injection joint pipe is fixed to one of the at least one bearing end cover, and the other end of the oil injection joint pipe extends into the first oil injection channel.

5. The hoisting sheave according to claim 4, wherein the end of the oil injection joint pipe extending into the first oil injection channel is sleeved with a slide ring seal, wherein an outer circular surface of the slide ring seal is in interference fit with an inner wall of the first oil injection channel, and an inner wall of the slide ring seal is in clearance fit with an outer circular surface of the oil injection joint pipe.

6. The hoisting sheave according to claim 5, wherein the at least one bearing end cover is further provided with a second oil injection hole for lubricating the rolling bearing and an oil suction hole for recycling waste lubricating oil; wherein an oil outlet of the second oil injection hole corresponds to a rolling body of the rolling bearing, and an oil inlet of the oil suction hole is located at the rolling body with 180° away from the oil outlet of the second oil injection hole in a circumferential direction.

7. The hoisting sheave according to claim 6, wherein two or more floating sheaves are provided; the hoisting sheave shaft between the floating sheave and the fixed sheave or between two floating sheaves is sleeved with a sealing ring to prevent a loss of the lubricating oil, and the sealing ring is also provided with an oil drainage nozzle for discharging waste lubricating oil in the sealing ring and an oil plug for plugging the oil drainage nozzle.

8. A hoisting sheave lubricating device, comprising the hoisting sheave according to claim 2, an oil injection pump and an oil suction pump; wherein the oil injection pump is used for injecting lubricating oil into the hoisting sheave in a timing and quantitative manner;
the oil suction pump is used for recycling waste lubricating oil in the hoisting sheave; and
an oil outlet of the oil injection pump is connected to a first oil injection hole and a second oil injection hole through an oil injection pipe, and an oil suction inlet of the oil suction pump is connected to the hoisting sheave through an oil suction pipe.

9. The device according to claim 8, wherein each bearing seat is provided with a rolling bearing matched with the hoisting sheave shaft and at least one bearing end cover for protecting the rolling bearing; at least one of the at least one bearing end cover is provided with a first oil injection hole communicating with the first oil injection channel, and the first oil injection hole corresponds to the oil inlet of the first oil injection channel in position.

10. The device according to claim 9, wherein the oil inlet of the first oil injection channel is connected to the first oil injection hole through an oil injection joint pipe, wherein one end of the oil injection joint pipe is fixed to one of the at least one bearing end cover, and the other end of the oil injection joint pipe extends into the first oil injection channel.

11. The device according to claim 10, wherein the other end of the oil injection joint pipe extending into the first oil injection channel is sleeved with a slide ring seal, wherein an outer circular surface of the slide ring seal is in interference fit with an inner wall of the first oil injection channel, and an inner wall of the slide ring seal is in clearance fit with an outer circular surface of the oil injection joint pipe.

12. The device according to claim 11, wherein the at least one bearing end cover is further provided with a second oil injection hole for lubricating the rolling bearing and an oil suction hole for recycling waste lubricating oil; wherein an oil outlet of the second oil injection hole corresponds to a rolling body of the rolling bearing, and an oil inlet of the oil suction hole is located at the rolling body with 180° away from the oil outlet of the second oil injection hole in a circumferential direction.

13. The device according to claim 12, wherein two or more floating sheaves are provided; the hoisting sheave shaft between the floating sheave and the fixed sheave or between two floating sheaves is sleeved with a sealing ring to prevent a loss of the lubricating oil, and the sealing ring is also provided with an oil drainage nozzle for discharging waste lubricating oil in the sealing ring and an oil plug for plugging the oil drainage nozzle.

14. The device according to claim 13, wherein the oil injection pump is further provided with a bubble generation device for introducing an inert gas into the lubricating oil to improve the lubricating effect.

15. The device according to claim 12, wherein the oil injection pump is further provided with a bubble generation device for introducing an inert gas into the lubricating oil to improve the lubricating effect.

16. The device according to claim 11, wherein the oil injection pump is further provided with a bubble generation device for introducing an inert gas into the lubricating oil to improve the lubricating effect.

17. The device according to claim 10, wherein the oil injection pump is further provided with a bubble generation device for introducing an inert gas into the lubricating oil to improve the lubricating effect.

18. The device according to claim 9, wherein the oil injection pump is further provided with a bubble generation device for introducing an inert gas into the lubricating oil to improve the lubricating effect.

19. The device according to claim 8, wherein the oil injection pump is further provided with a bubble generation device for introducing an inert gas into the lubricating oil to improve the lubricating effect.

\* \* \* \* \*